US010589874B2

(12) United States Patent
Nestel et al.

(10) Patent No.: US 10,589,874 B2
(45) Date of Patent: Mar. 17, 2020

(54) VARIABLE PNEUMATIC OUTPUT WITH CONSTANT ELECTRICAL OUTPUT DRIVEN BY A SINGLE ENGINE

(71) Applicant: John Bean Technologies Corporation, Chicago, IL (US)

(72) Inventors: Steven U. Nestel, Odgen, UT (US); Brent Andrew Carlson, Ogden, UT (US); Kirk Rodney Nelson, Sandy, UT (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 16/177,313

(22) Filed: Oct. 31, 2018

(65) Prior Publication Data
US 2019/0071190 A1 Mar. 7, 2019

Related U.S. Application Data

(63) Continuation-in-part of application No. 15/197,495, filed on Jun. 29, 2016, now abandoned.

(51) Int. Cl.
*B64F 1/36* (2017.01)
*F02B 63/04* (2006.01)
(Continued)

(52) U.S. Cl.
CPC ............ *B64F 1/364* (2013.01); *F02B 63/047* (2013.01); *F02B 63/048* (2013.01);
(Continued)

(58) Field of Classification Search
CPC ...... B64F 1/364; F02B 63/047; F02B 63/048; F04B 35/002; F04B 35/04; F04B 35/06; F04C 29/0085
See application file for complete search history.

(56) References Cited

U.S. PATENT DOCUMENTS 5,031,690 A * 7/1991 Anderson ............ B60H 1/3226
165/43
6,424,891 B1 * 7/2002 Sargent ..................... B64F 1/34
701/33.2
(Continued)

FOREIGN PATENT DOCUMENTS

CN 101898499 A 12/2010
KR 10-2016-0010345 A 1/2016
(Continued)

OTHER PUBLICATIONS

International Search Report and Written Opinion dated Oct. 4, 2017, issued in corresponding International Application No. PCT/US2017/039442, filed Jun. 27, 2017, 14 pages.
(Continued)

*Primary Examiner* — Viet P Nguyen
(74) *Attorney, Agent, or Firm* — Christensen O'Connor Johnson Kindness PLLC

(57) ABSTRACT

In an embodiment, an integrated ground support system for an aircraft is described herein, the system including a frame on which the system is arranged as a singular assembly. An engine, drive train, alternator, bleed air unit, one or more electrical components, and air cycle machine are mounted on the frame. The engine operates at a first operational state associated with a first rotational speed that is independent of a frequency associated with electrical power, if only the electrical power is to be used by the aircraft, and the engine operates at a second operational state associated with a second rotational speed, different from the first rotational speed, that is a function of a pressure associated with bleed air or the conditioned air, if the electrical power and one of the bleed air or the conditioned air are to be used simultaneously by the aircraft.

20 Claims, 7 Drawing Sheets

(51) Int. Cl.
*F04C 29/00* (2006.01)
*F04B 35/00* (2006.01)
*F04B 35/04* (2006.01)
*F04B 35/06* (2006.01)

(52) U.S. Cl.
CPC ............ *F04B 35/002* (2013.01); *F04B 35/04* (2013.01); *F04B 35/06* (2013.01); *F04C 29/0085* (2013.01); *F02B 2063/045* (2013.01)

(56) References Cited

U.S. PATENT DOCUMENTS

| | | | |
|---|---|---|---|
| 7,461,516 B2 | 12/2008 | Leadingham et al. | |
| 7,651,052 B2* | 1/2010 | Delort | B64F 1/364 244/1 R |
| 8,030,801 B2* | 10/2011 | Mann, III | B64F 1/364 307/72 |
| 2003/0141049 A1* | 7/2003 | Kennedy | B60H 1/00421 165/202 |
| 2004/0172955 A1* | 9/2004 | Runk | B60H 1/322 62/133 |
| 2006/0055173 A1 | 3/2006 | Gianfranco | |
| 2006/0157987 A1* | 7/2006 | Albrecht | B64F 1/34 290/1 A |
| 2006/0201173 A1* | 9/2006 | Leathers | B64F 1/364 62/186 |
| 2008/0250803 A1 | 10/2008 | Leadingham et al. | |
| 2009/0107160 A1 | 4/2009 | Montminy et al. | |
| 2009/0108128 A1 | 4/2009 | Mann, III et al. | |
| 2009/0112368 A1* | 4/2009 | Mann, III | B64F 1/34 700/275 |
| 2010/0031676 A1* | 2/2010 | Urbain | B64F 1/364 62/89 |
| 2011/0048572 A1 | 3/2011 | Batson et al. | |
| 2011/0133573 A1 | 6/2011 | Ratnaparkhi et al. | |
| 2011/0187123 A1* | 8/2011 | Hamm | B65D 47/02 290/1 A |
| 2011/0221279 A1 | 9/2011 | Ratnaparkhi et al. | |
| 2012/0049633 A1* | 3/2012 | Leadingham | B64F 1/364 307/80 |
| 2013/0279212 A1 | 10/2013 | Leadingham | |
| 2014/0265582 A1 | 9/2014 | Hyypio | |
| 2015/0153092 A1 | 6/2015 | Urbain | |
| 2015/0349356 A1 | 12/2015 | Ribarov et al. | |
| 2016/0325850 A1* | 11/2016 | Moes | B64F 1/34 |
| 2017/0037775 A1* | 2/2017 | Jones | F02B 63/04 |
| 2017/0233103 A1* | 8/2017 | Teicholz | B64D 27/16 701/100 |
| 2017/0321598 A1* | 11/2017 | Williams | F01N 5/02 |
| 2018/0002037 A1 | 1/2018 | Nestel et al. | |
| 2018/0065760 A1* | 3/2018 | Anderson | B64F 1/364 |

FOREIGN PATENT DOCUMENTS

| | | |
|---|---|---|
| WO | 85/04149 A1 | 9/1985 |
| WO | 2006/093647 A1 | 9/2006 |
| WO | 2015/088338 A1 | 6/2015 |

OTHER PUBLICATIONS

International Search Report and Written Opinion dated Nov. 9, 2017, issued in corresponding International Application No. PCT/US2017/039079, filed Jun. 23, 2017, 12 pages.
Amendment After Non-Final Office Action, dated Apr. 9, 2018, from U.S. Appl. No. 15/197,495, filed Jun. 29, 2016, 16 pages.
Final Office Action dated May 31, 2018, from U.S. Appl. No. 15/197,495, filed Jun. 29, 2016, 23 pages.
Office Action dated Dec. 8, 2017, from U.S. Appl. No. 15/197,495, filed Jun. 29, 2016, 24 pages.

* cited by examiner

VARIABLE PNEUMATIC OUTPUT WITH CONSTANT ELECTRICAL OUTPUT DRIVEN BY A SINGLE ENGINE

CROSS-REFERENCE TO RELATED APPLICATIONS

This application is a continuation-in-part of U.S. patent application Ser. No. 15/197,495 filed Jun. 29, 2016, the disclosure of which is incorporated herein by reference in its entirety.

BACKGROUND

Aircraft, when at a terminal or otherwise on the ground, require utility support of various types especially when the aircraft engines are not powered up. One utility need is electrical power in the form of alternating current (AC) power at various frequencies and voltages and/or direct current (DC) power at various voltages. The required voltages and other parameters of the electrical power differ from aircraft to aircraft.

Aircraft on the ground may also require bleed air. Bleed air is high pressure air used by aircraft to operate onboard environmental control systems and to start gas turbine engines. When in flight, bleed air is siphoned off of the compressor stage of the aircraft engine, but this source of bleed air is not available when the aircraft is on the ground and de-powered.

A third utility need for aircraft on the ground is conditioned air, including for the cockpit and the cabin, as well as to provide cooling or heating to onboard electrical systems.

To date, the foregoing three utility functions have been fulfilled by individual pieces of ground supported equipment (GSE). In this regard, individual utility carts, for ground power, are commercially available. Such utility carts are typically powered by an internal combustion engine. The engine is paired with an electrical generator. The power from the generator must be converted to the correct type of power (AC/DC) at the correct power parameters through the use of a converter system. Typically, such power generators are relatively large and thus are mounted on a cart as a singular or separate equipment unit.

Bleed air has also typically been provided using a singular utility cart on which is mounted an internal combustion engine and a large screw-type compressor in order to provide air at a sufficient pressure and volume to meet aircraft needs, including for starting the aircraft engines. For example, bleed air is supplied at 150 pounds of air per minute at 65 psia.

Air conditioning units also typically have been mounted on individual carts. The units are powered by an internal combustion engine paired with a refrigerant-based air conditioning system. The components required for a refrigerant-based system are numerous, thereby occupying large volumes and thus commonly requiring a separate cart. Air cycle air conditioning systems have also been developed wherein pressurized air is supplied to the air cycle machine for further compression and then rapid cooling by expansion before being supplied to the aircraft. In these situations, the compressed air supplied to the air cycle machine originates from an external compressed air source, typically a large central compressor plant located at the airport.

There has been some attempt to seek to combine utility supply for aircraft, including for example providing both power and conditioned air to an aircraft. Such units utilize a diesel driven or electric motor driven power plant mounted on a cart to power both an air conditioning system and an electrical generator. However, such systems do not also provide bleed air for aircraft.

The present disclosure seeks to provide an integrated, singular modular cart that provides three utility needs for aircraft including electrical power, air conditioning, and bleed air thereby eliminating the requirement for multiple ground support carts by replacing heretofore three individual ground support carts with a singular unit.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An integrated ground support system for aircraft provides pressurized air, conditioned air, as well as electrical power in a singular assembly. The support system includes a power plant mounted on a frame to produce power to operate the ground support system. In this regard, the power plant powers an air compressor, also mounted on the frame, to produce compressed air for use by the aircraft. A drive train interconnects the power plant to the air compressor to power the air compressor.

The power plant also powers an electrical generator mounted on the frame to produce electrical power used by the aircraft. A drive train interconnects the power plant to the electrical power generator.

In addition, an air conditioner is mounted on the frame to produce conditioned air for use by the aircraft. Depending on the type of air conditioner, the air conditioner may also be powered by the power plant.

In a further aspect of the present disclosure, the frame on which the power plant, air compressor, air conditioner and electrical generator are all mounted, forms part of a portable, wheeled chassis. The size of the chassis, and thus the integrated ground support system, is designed to enable the chassis to be moved about an airport, an airfield, or an aircraft hangar so as to be put into position relative to the aircraft being supported.

In a further aspect of the present disclosure, the power plant may be an internal combustion diesel engine, an internal combustion gasoline engine, or an electrical motor.

In a further aspect of the present disclosure, the air compressor may be a screw-type air compressor, a centrifugal air compressor, or a piston-type air compressor. The drive train interconnecting the power plant to the air compressor can be configured to increase the rotational output speed of the power plant to drive the air compressor at a higher rotational speed than the output speed of the power plant. This is especially true if the air compressor is a centrifugal-type air compressor, which typically operates at a much higher rotational speed than the output of a power plant in the form of an internal combustion engine.

In accordance with a further aspect of the present disclosure, if the air conditioner is an air cycle-based air conditioner, pressurized air is transmitted from the air compressor to the air cycle-based air conditioner where the intake air from the air compressor is further compressed and then expanded to rapidly cool the air for use by the aircraft.

In a further aspect of the present disclosure, the power generator is either a direct current generator or an alternating current generator. The power converter is employed to convert the power generated by the power generator into direct current of selected parameters and/or alternating current of selected parameters.

In accordance with a further aspect of the present disclosure, a cooling system is provided for controlling the operational temperature of the air compressor, the air conditioner, and/or the electrical power generator. A singular cooling unit may be used for all three of these functions, or the cooling functions may be carried out by more than one cooling unit.

In some aspect of the present disclosure, an integrated ground support system for an aircraft includes a frame on which the system is arranged as a singular assembly; an engine mounted on the frame and configured to power the system; a drive train, an alternator, and a bleed air unit mounted on the frame, the drive train disposed between and interconnected to the engine and each of the alternator and the bleed air unit; one or more electrical components mounted on the frame and electrically connected to the alternator, wherein the one or more electrical components is configured to produce electrical power for use by the aircraft; and an air cycle machine mounted on the frame and connected to the bleed air unit, wherein the bleed air unit is configured to produce bleed air for use by the aircraft and the air cycle machine is configured to produce conditioned air for use by the aircraft. The engine operates at a first operational state associated with a first rotational speed that is independent of a frequency associated with the electrical power, if only the electrical power is to be used by the aircraft, and the engine operates at a second operational state associated with a second rotational speed, different from the first rotational speed, that is a function of a pressure associated with the bleed air or the conditioned air, if the electrical power and one of the bleed air or the conditioned air are to be used simultaneously by the aircraft.

In still another aspect of the present disclosure, an integrated ground support system for an aircraft includes a frame on which the system is arranged as a singular assembly; an engine mounted on the frame and configured to power the system; a drive train, an alternator, and a bleed air unit mounted on the frame, the drive train disposed between and interconnected to the engine and each of the alternator and the bleed air unit; an inverter and a power converter mounted on the frame, the inverter disposed between and electrically connected to the alternator and the power converter, wherein the power converter is configured to produce electrical power for use by the aircraft; a first control loop connected to the power converter and configured to monitor and maintain the electrical power at a level required by the aircraft; an air cycle machine mounted on the frame and connected to the bleed air unit, wherein the bleed air unit is configured to produce bleed air for use by the aircraft and the air cycle machine is configured to produce conditioned air for use by the aircraft; and a second control loop connected to the bleed air unit and the air cycle machine and configured to monitor and maintain the bleed air or conditioned air at a level required by the aircraft.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "right hand," "left hand," "in," "out," "extended," "advanced," "retracted," "proximal," and "distal." These references and other similar references in the present application are only to assist in helping describe and understand the present invention and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

Figure 1:
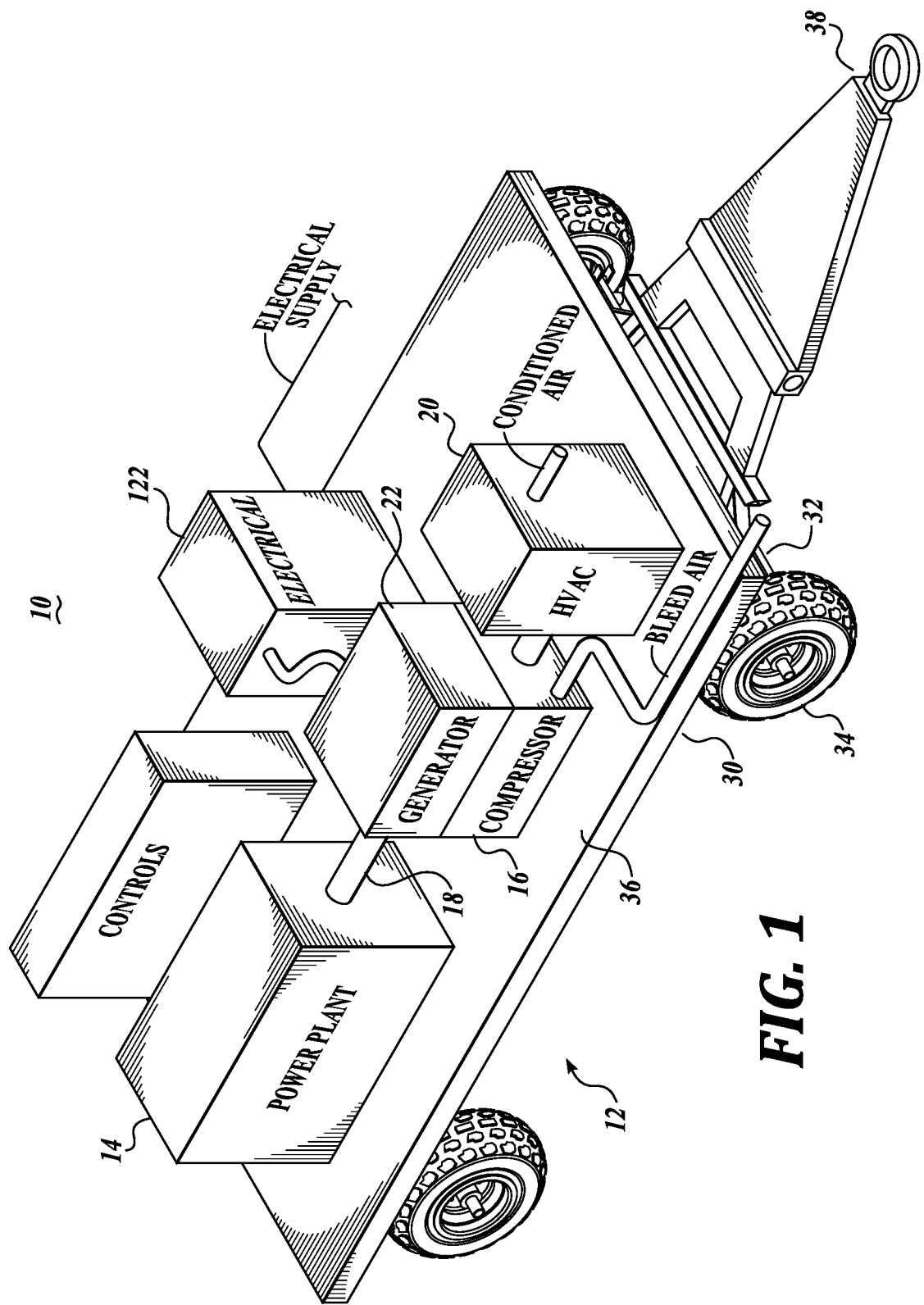
FIG. 1 is a schematic view of a utility cart on which three separate utilities for servicing an aircraft are provided, including bleed air, conditioned air, and electrical power.

Referring initially to FIG. 1, an integrated ground support system 10 provides utilities to aircraft on the ground, including pressurized air, conditioned air, and electrical power. The system 10 is configured as a singular assembly mounted on a cart 12. The integrated ground support system includes a power plant 14 mounted on chassis 30 for producing power to operate the ground support system 10. An air compressor 16 is also mounted on the chassis 30 to produce compressed air for the aircraft. A drive train 18 interconnects the power plant to the air compressor. An air conditioner system 20 is mounted on the chassis 30 to produce conditioned air for the aircraft. An electrical generator 22, powered by the power plant, is also mounted on the chassis 30 to produce electrical power for the aircraft. The drive train 18 connects the power plant to the electrical power generator. The foregoing aspects of the present disclosure are described more fully below.

Referring specifically to FIG. 1, the cart 12 includes a chassis 30 composed of an underlying frame 32 mounted on wheels 34. The chassis also includes platform 36 on which the components of the integrated ground support system 10 are mounted. A tow bar 38 is provided to enable the cart 12 to be easily moved from place to place. The cart 12 can be of various constructions, but ideally is relatively compact in size, especially for its function of carrying and supporting power plant 14, air compressor 16, air conditioner 20, as well as electrical generator 22. In this regard, the chassis 30 can be constructed to have a maximum length of about from 100 inches to 150 inches and a maximum width of about from 66 inches to 96 inches. Also, in keeping with the small envelope of the integrated ground support system 10, the maximum height of the ground support system may be from about 60 inches to 96 inches. Of course, the foregoing dimensions may be greater or less than the designated specific dimensions and still provide a cart that provides all the functions of the integrated ground support system 10 of the present disclosure while also being portable and small enough to be used in supporting aircraft, including on crowded airfields.

Figure 2:
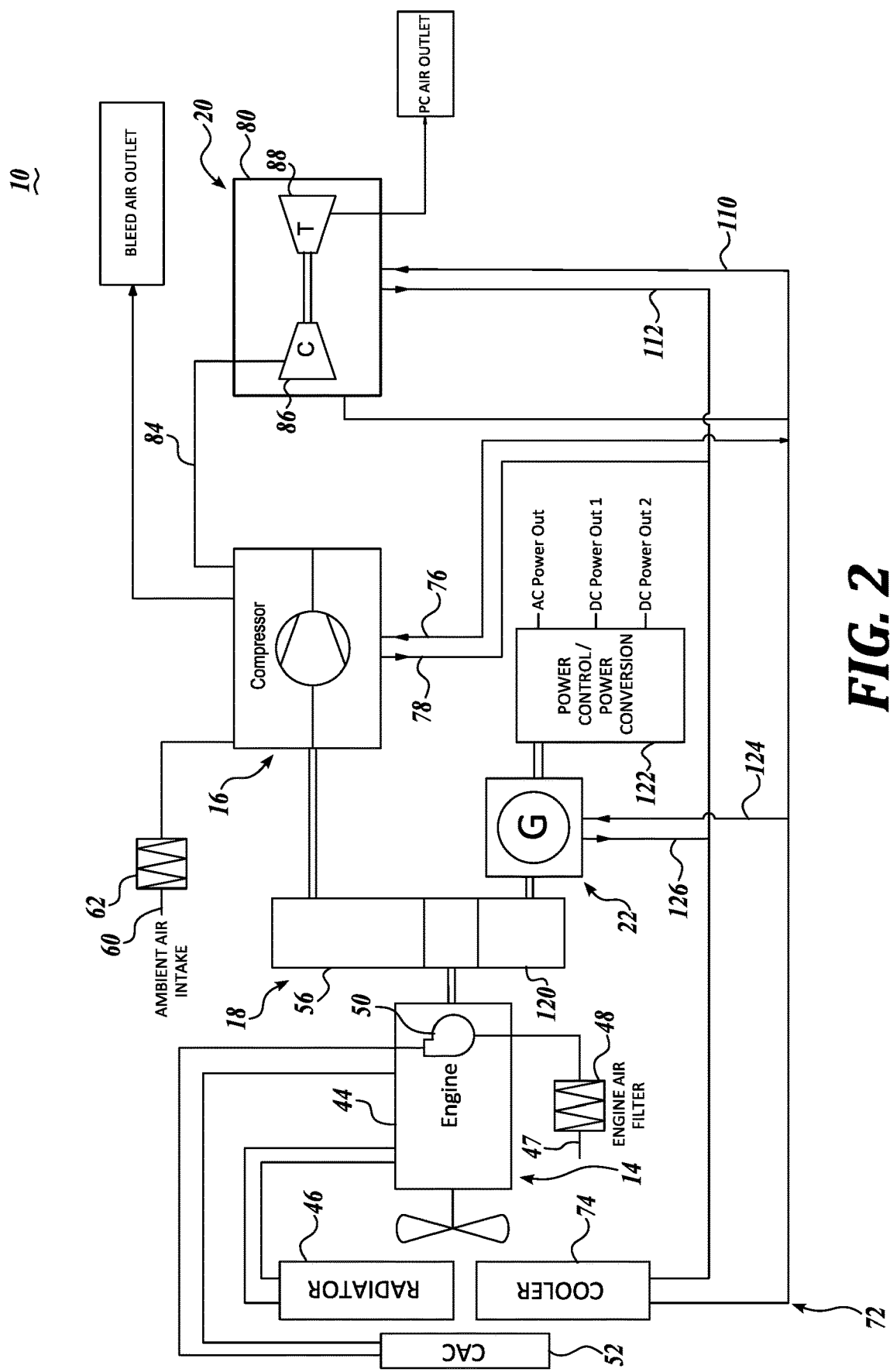
FIG. 2 is a schematic diagram of the integrated ground support system of the present disclosure utilizing an air cycle air conditioner unit for generating conditioned air.
Figure 3:
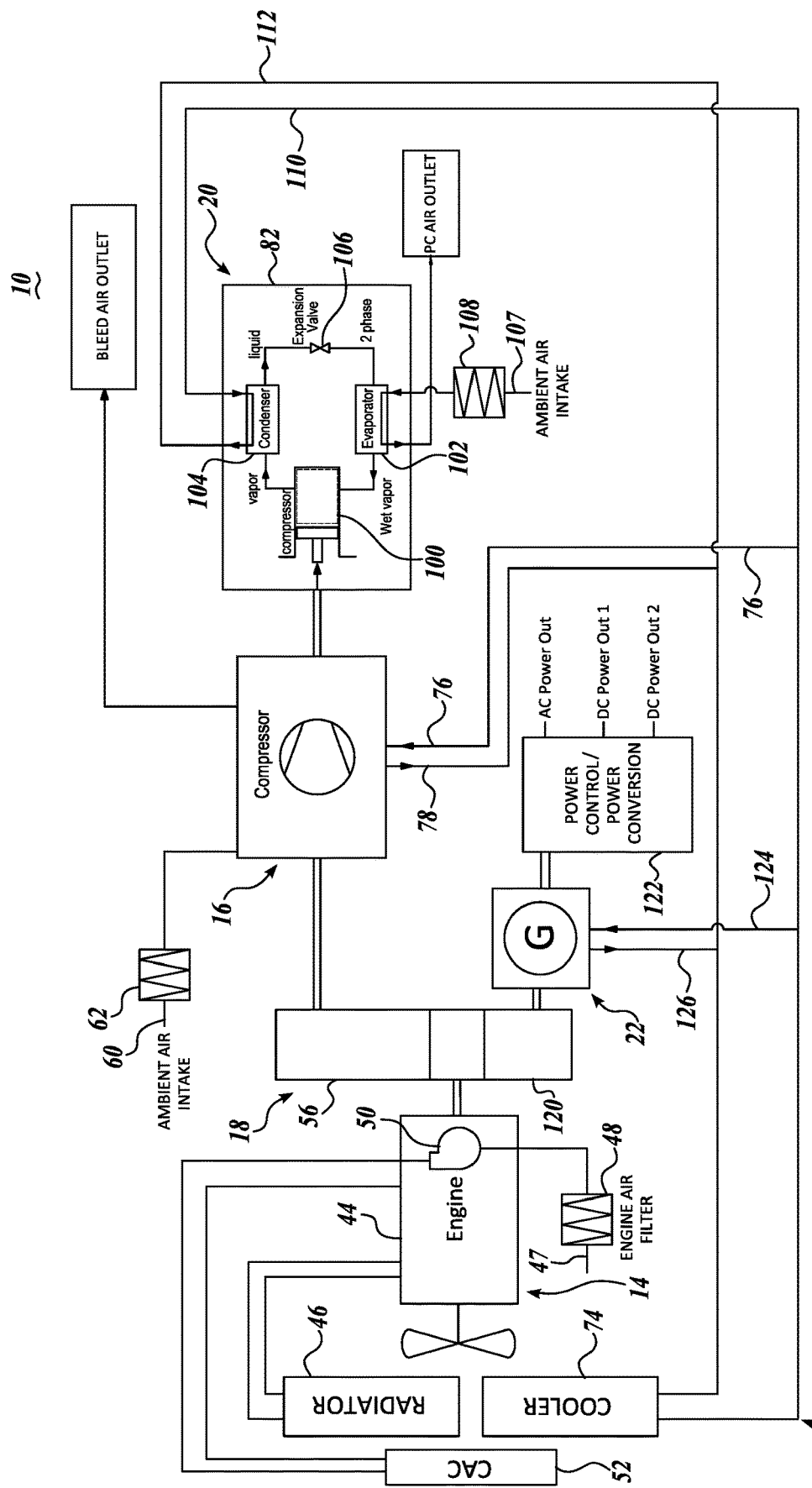
FIG. 3 is a schematic view of a ground support system similar to FIG. 2, but with the conditioned air provided by a refrigerant-based system.

The power plant 14 can be of various constructions, including an internal combustion engine 44 schematically illustrated in FIGS. 2 and 3. The internal combustion engine 44 may be a diesel fueled engine or a gasoline fueled engine and of sufficient size to readily power the ground support system but also to provide reasonable fuel economy. Such diesel and gasoline driven internal combustion engines to serve as the power plant 14 are articles of commerce. The power plant may also be in the form of an electrical motor, which draws electrical power from an airport source, perhaps located adjacent an airport terminal gate or aircraft hangar.

Referring to FIGS. 2 and 3, if an internal combustion engine is utilized, typically the engine will require a radiator 46 to provide cooling for the engine. Also, to help ensure operation of the engine 44 with minimal maintenance, a robust air intake system is provided which includes an air intake 47 leading to an air filter unit 48 located upstream from a turbo blower 50 that directs the intake air through a charge air cooler (CAC) 52 to cool the air before being directed to the intake system of the engine 44. The turbo blower 50 is driven by the engine exhaust gas in a standard manner. Power plants, such as engine 44, are capable of a long reliable service life with minimal maintenance, for example, primarily only periodically changing the air filter and the engine oil and engine oil filter.

The compressor 16 may be of various types, including piston-type compressor, a screw-type compressor, or a centrifugal compressor, all of which are articles of commerce. Drive train 18 interconnects the compressor with the rotational output of the engine. Depending on the type of compressor utilized, the rotational speed of the engine output may need to be stepped up by the drive train. For example, if a centrifugal compressor is utilized, such compressor commonly operators in the speed range of about 24000 to 43000 rpm. However, for long life, the engine 44 typically operates at a speed of about 1300 to 2300 rpm. Thus, the transmission of the drive train 18 must increase the speed of the engine output considerably to drive the centrifugal compressor at its operational speed. In this regard, a multi-stage transmission may be employed. On the other hand, if the compressor is a screw-type compressor or a piston-type compressor, the output speed of the engine 44 need not be increased to nearly the rotational speed of a centrifugal compressor.

Referring to FIGS. 2 and 3, the compressor 16 includes an ambient air intake 60 wherein the ambient air flows first through a filter 62, and then into the intake of the compressor 16. The compressor 16 produces bleed air for the aircraft at desired parameters, for example, at a pressure of about 50 psig, at 100 to 150 pounds per minute, and at a temperature of about 320° F. The pressure and temperature of the output can be monitored by appropriate sensing devices, not shown.

A cooling system 72 is provided for controlling the operational temperature of the compressor 16. The cooling system includes a cooler or heat exchanger 74 interconnected with the compressor 16 by lines 76 and 78 that route a cooling medium from the heat exchanger 74 to the compressor 16 and then from the compressor back to the heat exchanger 74.

Various types of air conditioning systems may be utilized with the ground support system 10. FIG. 2 schematically illustrates an air conditioner in the form of an air cycle air conditioner or machine 80, whereas FIG. 3 schematically illustrates refrigerant-based air conditioner 82. Initially referring to FIG. 2, the air cycle air conditioner 80 receives compressed air from the compressor 16 through line 84. Such intake air is further compressed by a compressor 86 and then expanded, and thereby cooled in a turbine 88. The air cycle machine 80 is capable of producing conditioned air for the aircraft at desired parameters, for example, at a temperature of approximately 34° F. to 40° F. and at a volume of 55-100 pounds per minute at a pressure of about 4 to 5 psig.

The outlet pressure and temperature of the conditioned air can be monitored by applicable pressure and temperature meters. It will be appreciated that air cycle machine 80 is powered by the compressed input air entering the air cycle machine through line 84. No separate power or drive system is required for the operation of the air cycle machine 80.

Referring to FIG. 3, the air conditioner 82 is schematically depicted as a refrigerant-based configuration. The air conditioner 82 in this regard includes a compressor 100 for compressing the refrigerant in vapor form exiting evaporator 102. The compressor compresses the vapor sufficiently so that at condenser 104, when heat from the compressed vapor is expelled to the ambient, the cooling medium transforms into liquid form. The cooling medium is then routed to an expansion valve 106 which expands the liquid refrigerant into a liquid/vapor mixture and substantially cools the refrigerant prior to entering evaporator 102. At the evaporator 102, ambient air is significantly cooled by giving off heat to the refrigerant in the evaporator prior to the ambient air being routed to the aircraft. The ambient air enters air intake 107 and then flows through air filter 108 prior to reaching the evaporator 102. The refrigerant-based air conditioner 82 shown in FIG. 3 is of a "direct expansion" type, since the air supplied to the aircraft is directly cooled by the evaporator 102 after the refrigerant has been expanded by valve 106. A fan, not shown, is used to circulate the air through the filter 108, the evaporator 102, and then to the aircraft.

Cooling system 72 controls the operational temperature of the air cycle machine 80 and refrigerant-based air conditioner 82 shown in FIGS. 2 and 3. In this regard, direct the coolant medium from the cooler 74 to and from the air cycle machine 80 and the condenser of the refrigerant-based air conditioner 82, as illustrated in the figures.

The electrical generator 22 is powered by the engine 44 through the use of the drive train 18. A transmission 120 speeds up the rotational output from the engine 44 for the operation of the generator 22. The generator 22 can be of various types, including an alternating current generator or a direct current generator, which are articles of commerce. Regardless of the type of generator utilized, a power control/power conversion system 122 converts the output from the generator 22 to provide power to the aircraft having specific parameters. An example of one such parameter set may be three phase AC power at: 400 Hz; 60 kW to 90 kW; and either 120 or 208 Volts. Other power parameters may be utilized, for example, the AC power may be at approximately 115 or 200 Volts.

DC power may be provided at various parameters, such as at 270 Volts at a level of 72 kW. Another example of DC power parameters produced by the power control/power conversion system 122 is: 28 Volts at 500 amps continuously, or 1500 amps for 5 minutes. The point is that different aircraft have different power requirements and that the power control/power conversion system 122 is capable of producing AC and/or DC power at the required parameters. One form of power control/power conversion system 122 that may be utilized with integrated ground support system 10 is disclosed in co-pending U.S. patent application Ser. No. 15/197460, incorporated herein by reference.

The cooling system 72 may be also used to control the operational temperature of the generator 22. In this regard, lines 124 and 126 direct the coolant medium to and from the generator 22, as shown in the FIGURES. It will be appreciated that although one cooling system 74 is illustrated, more than one cooling system may be employed to control the operational temperatures of compressor 16, air conditioning system 20, and electrical generator 22.

As will be appreciated, the foregoing describes an integrated ground support system 10 mounted on a singular cart 12. During the operation of the system 10, if an air cycle machine 80 is utilized for providing air conditioning to the aircraft, then the bleed air system is not operated simultaneously with the air cycle machine because the air cycle machine utilizes the compressed air from compressor 16 for its operation. Also, typically, AC and DC power is not provided simultaneously via the power control/power conversion system; rather, either DC or AC power is provided by the system.

Figure 4:
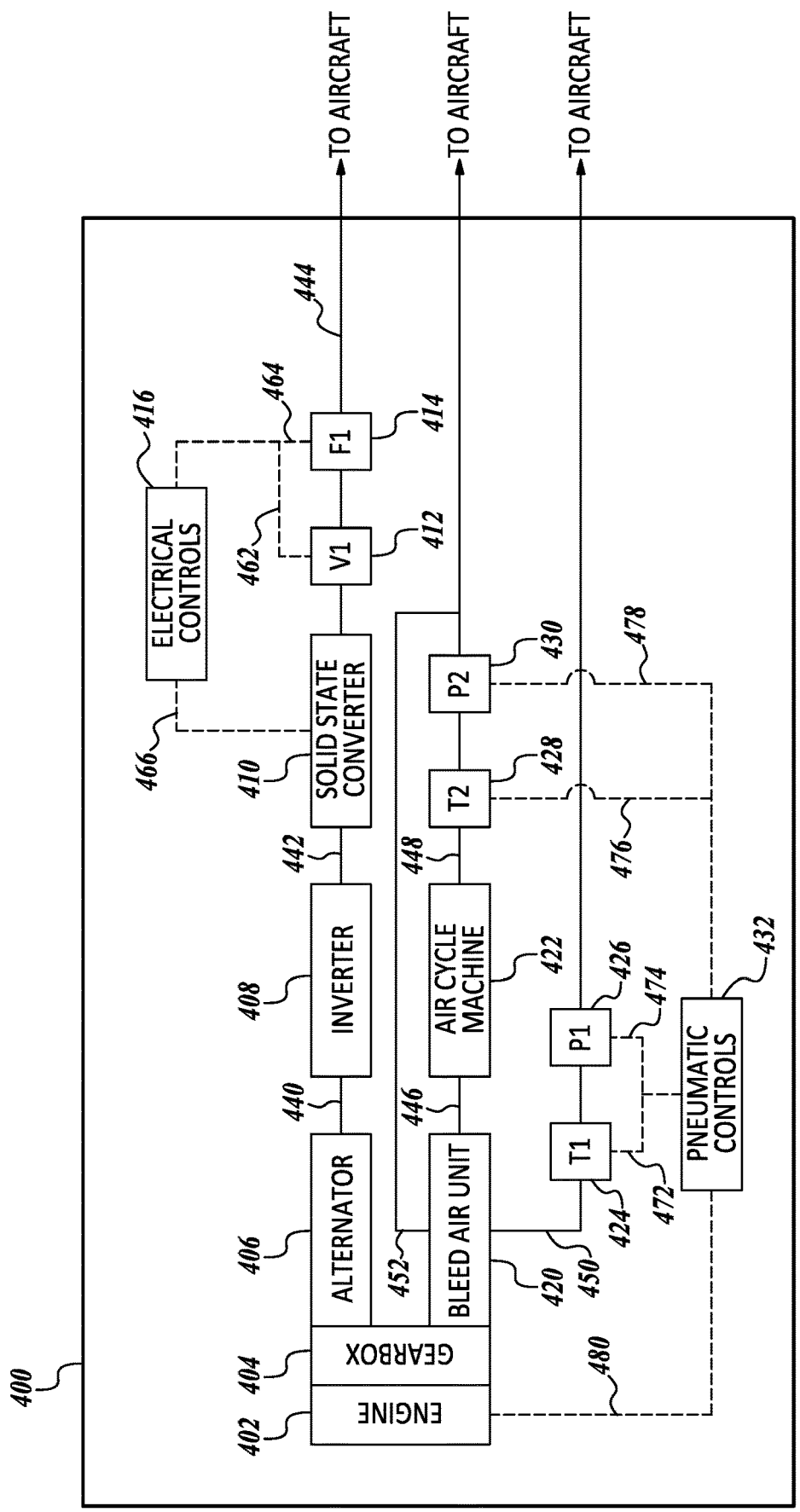
FIG. 4 depicts a block diagram of an example integrated ground support system in accordance with some embodiments of the present disclosure.

FIG. 4 depicts a block diagram of an example integrated ground support system 400 in accordance with some embodiments of the present disclosure. System 400 is configured to provide utilities to an aircraft on the ground, including electrical power, pressurized air, and conditioned air. System 400 comprises an alternative to system 10 and is configured as a singular, integrated assembly mounted on cart 12. In some embodiments, system 400 is configured to be a compact structure, having a weight in the range of 6,000 to 9,000 pounds (lb) and overall dimensions in the range of 120 inches in length by 85 inches in height by 70 inches in width.

System 400 includes an engine 402 coupled to a gearbox 404, and the gearbox 404 coupled to each of an alternator 406 and a bleed air unit 420. System 400 further includes an inverter 408, a solid state converter 410, a voltage sensor 412, and a frequency sensor 414, electrically coupled to each other. Inverter 408 is disposed between the alternator 406 and solid state converter 410. Voltage sensor 412 is disposed between the solid state converter 410 and the frequency sensor 414. An electrical control or feedback loop is formed by the outputs of sensors 412, 414 coupling to electrical controls 416 included in system 400, and the electrical controls 416, in turn, coupling to the solid state converter 410.

System 400 also includes an air cycle machine 422, a temperature sensor 424, a pressure sensor 426, a temperature sensor 428, a pressure sensor 430, and pneumatic controls 432. Temperature sensor 424 and pressure sensor 426 are disposed at a first output of the bleed air unit 420. A second output of the bleed air unit 420, different from the first output of the bleed air unit 420, couples to the air cycle machine 422, with temperature and pressure sensors 428, 430 disposed at the output of the air cycle machine 422. As will be described in detail below, a (pneumatic or air) line 452 is provided between the output of the air cycle machine 422 and an input of the bleed air unit 420.

A pneumatic control or feedback loop is formed by the outputs of sensors 424, 426, 428, 430 coupling to pneumatic controls 432, and the pneumatic controls 432 coupling to the engine 480.

In some embodiments, engine 402 comprises the power plant or power source that powers or drives all the components of the system 400. Engine 402 is configured to produce (rotational) mechanical energy using at least one fuel source such as, but not limited to, diesel, gasoline, compressed natural gas (CNG), or the like. In particular, engine 402 is configured to generate a particular rotational speed, as will be described in detail below. Engine 402 may comprise a diesel, gasoline, CNG, or other fuel type engine or turbine. Engine 402 may also be referred to as a prime mover, power plant, or power source. As an example, engine 402 may comprise a diesel engine capable of producing rotational speeds in the range of approximately 1,600 to 2,400 revolutions per minute (RPM).

Gearbox 404, also referred to as a drive train, is configured to mechanically or physically couple with the output of the engine 402 to transform the output rotational speed of engine 402 to one or more particular other rotational speeds. Gearbox 404 includes one or more fixed gear mechanisms at one or more output shafts to perform the rotational speed transformation. In some embodiments, gearbox 404 includes a first fixed gear mechanism for a first output shaft coupled to alternator 406 and a second fixed gear mechanism for a second output shaft coupled to bleed air unit 420. The gear ratio associated with each of the first and second fixed gear mechanisms is selected based on operating rotational speed range of the engine 402 and/or desired transformed rotational speed (e.g., the output rotational speed) to be provided to the bleed air unit 420. Hence, the gear ratio of the first and second fixed gear mechanisms can be the same or different from each other. The gear ratios may be fixed or set at the factory or during system configuration and not change during (normal) operation of the system 400. As an example, the gear ratios associated with the first and second gear mechanisms ranges from 3:1 to 20:1.

Alternator 406 comprises a device driven by the first output shaft of the gearbox 404 and is configured to generate an alternating current (AC) electrical output 440 at a frequency that is a function of the gear ratio of the first gear mechanism included in the gearbox 404 and the rotational speed output of the engine 402. Assuming the gear ratio of the first gear mechanism is fixed, as the engine rotational speed increases or decreases, the frequency of the AC electrical output from the alternator 406 also increases or decreases, respectively. AC electrical output 440 (also referred to as an AC output, AC power, AC electrical energy, or alternator output) comprises power at a variable voltage and frequency that is determined by the engine 402 rotational speed and gearbox's 404 first output shaft gear ratio (the output shaft connected to the alternator 406). AC electrical output 440 comprises three-phase power, single phase power, or the like. AC electrical output 440 can range, for example, without limitation, 200 to 340 Volt (V) AC at 250 to 350 Hertz (Hz).

AC electrical output 440 comprises the input to inverter 408. Inverter 408 is configured to convert AC electrical output 440 into a direct current (DC) electrical output 442 of a fixed voltage. Inverter 408 includes one or more rectifiers and may also include one or more electrical components to amplify, filter, and/or otherwise change or shape the AC electrical output 440 into a signal appropriate for input to solid state converter 410. In some embodiments, DC electrical output 442 may comprise a fixed voltage of 650 V DC.

DC electrical output 442 comprises the input to the solid state converter 410. Solid state converter 410 is configured to generate an electrical output 444 appropriate for a particular aircraft to be connected to system 400 for ground service, from the DC electrical output 442. Electrical output 444 is configured to be AC or DC power, have a particular voltage level or amplitude, and at a particular frequency in accordance with the electrical output requirement of the particular aircraft to be connected to system 400. The electrical output 444 (also referred to as the output power of system 400) can be AC power at a fixed frequency and voltage (e.g., 400 Hz and 115 V AC) or DC power at a fixed voltage (e.g., 28 V DC or 270 V DC), for example.

Not only is the solid state converter 410 configured to change the DC electrical output 442 to an AC signal, if required, or maintain as a DC signal, the voltage level/amplitude of the converted signal may also differ from that of the DC electrical output 442. Solid state converter 410 is also configured to perform one or more other power conditioning on the DC electrical output 442 to generate electrical output 444. Thus, even if the electrical output 444 comprises DC power, solid state converter 410 conditions or changes the DC electrical output 442 in one or more ways. For example, solid state converter 410 may condition the incoming DC signal to filter out noise, change the voltage level, and/or improve tolerance to transient loads.

In some embodiments, solid state converter 410 includes digital or solid state components such as, but not limited to, power switches, transformers, and filters, and may operate in accordance with firmware and/or software instructions. In this manner, regardless of the particular voltage, frequency, and/or direct or alternating power output of the engine 402, solid state converter 410 is configured to produce an electrical output 444 tailored for the particular aircraft to be serviced. Solid state converter 410 may also be referred to as a power conditioning unit, power converter, or converter.

Voltage and frequency sensors 412, 414 are configured to sense or detect the voltage level and frequency of the electrical output 444, respectively. Voltage and frequency sensors 412, 414 may be configured to continuously, periodically, upon command by electrical controls 416, and/or otherwise repeatedly monitor the electrical output 444 characteristics over time. The detected voltage and frequency values 462, 464 are provided to electrical controls 416.

Electrical controls 416 comprises hardware, firmware, and/or software configured to process the voltage and frequency values 462, 464 and determine whether conversion of the incoming DC signal into the solid state converter 410 is to be modified so as to adjust the electrical output 444. Depending on fluctuations in the operation of engine 402, electrical loads actuated on the aircraft, and/or other factors, the current electrical output 444 may deviate from the desired electrical output value or range. If the electrical output 444 is determined to deviate outside a pre-set value or range, electrical controls 416 can provide a command to the solid state converter 410 to adjust its processing operations, thereby resulting in a subsequent electrical output 444 within the pre-set value or range. This control loop permits the electrical output characteristics to be maintained within a desired value/range in accordance with the particular aircraft's requirements.

In some embodiments, sensors 412, 414 and/or electrical controls 416 may be included within solid state converter 410. In such a configuration, the control loop described above may be modified or internal to the solid state converter 410.

Bleed air unit 420 is driven by the second output shafts associated with the second gear mechanism included in the gearbox 404. Bleed air unit 420 includes one or more pneumatic compressors, heat exchangers, piping, and the like configured to generate high pressure and high temperature air (also referred to as bleed air or pressurized air) based on the gear ratio of the second gear mechanism included in the gearbox 404 and the rotational speed output of the engine 402.

Bleed air unit 420 further includes one or more valves configured to control the output of the generated bleed air to certain pneumatic/air lines or piping. The bleed air generated by bleed air unit 420 is directed to line 450 to be provided as the bleed air output to the aircraft or to line 446 to serve as the input to the air cycle machine 422. Bleed air provided as input to the air cycle machine 422 may be referred to as internal bleed air while bleed air provided to the aircraft via line 446 may be referred to as bleed air output (of system 400). The bleed air generated by bleed air unit 420 can be provided to one of line 446 or 450 at a given time, but not both simultaneously. Thus, system 400 is capable of providing bleed air output or conditioned air output (via air cycle machine 422), but not both at the same time.

In some embodiments, internal bleed air and bleed air output may be the same or different from each other. For instance, internal bleed air (e.g., high pressure and high temperature air that is piped to the air cycle machine 422) may be in the range of 20-35 pound-force per square inch gauge (psig) at 200-250° F., and bleed air output (e.g., high pressure and high temperature air that is provided to the aircraft) may be in the range of 35-50 psig at 250-320° F.

In some embodiments, temperature and pressure sensors 424, 426 are configured to sense, detect, monitor, or measure at least the temperature and pressure, respectively, of the bleed air output provided at line 450. The sensed temperature and pressure values are provided to the pneumatic controls 432 via lines 472, 474, respectively. Pneumatic controls 432, in turn, is configured to process the received sensed values and determine whether the bleed air output deviates from a desired value or range. If the deviation exceeds a threshold, then pneumatic control 432 is configured to command or otherwise facilitate, via line 480, causing the rotational speed output of engine 402 to change. The change to the rotational speed of engine 402 may be incremental, or of a plurality of increments, to cause the bleed air output to return to the desired value or range. For example, pneumatic loads actuated on the aircraft, external environmental temperature, external environmental pressure (e.g., high elevation locations such as Denver), and/or other factors can cause the bleed air output to deviate from a desired value/range. This control loop permits the bleed air output to be maintained within a desired value/range in accordance with the particular aircraft's requirements.

When bleed air from bleed air unit 420 comprises the input to air cycle machine 422, such bleed air also drives or powers the air cycle machine 422. The air cycle machine 422 is configured to convert the incoming high pressure hot air into lower pressure cold air, outputted in line 448 as conditioned air output to be provided to the aircraft. Air cycle machine 422 includes one or more compressors, turbines, heat exchangers, piping, and the like to perform the conversion. As an example, without limitation, the conditioned air output (e.g., lower pressure and lower temperature air relative to bleed air output) is in the range of 3-5 psig at 40-55° F.

Temperature and pressure sensors 428, 430 are configured to sense, detect, monitor, or measure at least the temperature and pressure, respectively, of the conditioned air output provided at line 448. The sensed temperature and pressure values are provided to the pneumatic controls 432 via lines 476, 478, respectively. Pneumatic controls 432, in turn, is configured to process the received sensed values and determine whether the conditioned air output deviates from a desired value or range. If the deviation exceeds a threshold, then pneumatic control 432 is configured to command or otherwise facilitate, via line 480, causing the rotational speed output of engine 402 to change. The change to the rotational speed of engine 402 may be incremental, or of a plurality of increments, to cause the conditioned air output to return to the desired value or range. For example, pneumatic loads actuated on the aircraft, external environmental temperature, external environmental pressure (e.g., high elevation locations such as Denver), external humidity, and/or other factors can cause the conditioned air output to deviate from a desired value/range. This control loop permits the conditioned air output to be maintained within a desired value/range in accordance with the particular aircraft's requirements.

In some embodiments, pressure sensors 426, 430 comprise pressure transducers, temperature sensors 424, 428 comprise resistive temperature devices, and the pneumatic controls 432 comprises a digital controller.

When more conditioned air is produced than the aircraft can consume, only electrical output is provided to the aircraft, and/or all or portion of the output of bleed air unit 420 will not be consumed by the aircraft, then the output of bleed air unit 420 is disposed of, diverted, and/or otherwise handled to prevent potential inquiry to ground service personnel in proximity to system 400. Exposure to potentially high pressure and/or high temperature air is proactively prevented by system 400. In some embodiments, if only electrical output is to be consumed by the aircraft, for example, then the bleed air generated by bleed air unit 420 can be directed to line 446, to be converted into conditioned air by air cycle machine 422, and then the conditioned air is recirculated back to the intake of the bleed air unit 420 via line 452 (also referred to as the conditioned air recirculation loop). The conditioned air recirculated to the bleed air unit 420 may facilitate cooling of the bleed air unit 420 and also serve to internally use or consume the otherwise wasted pneumatic output of system 400. A valve may be included at the intake end of line 452 (e.g., proximate the intersection of lines 452 and 448) to control the flow of the conditioned air output to be provided to the aircraft or to the recirculation loop associated with line 452.

Alternatively, if only electrical output is to be consumed by the aircraft, for example, bleed air generated by bleed air unit 420 may be directed to line 450 and a diverter or dissipation line can connect to line 450 to dispose, reject, or otherwise safely dissipate the bleed air in a manner that would be safe for ground service personnel.

Figure 5:
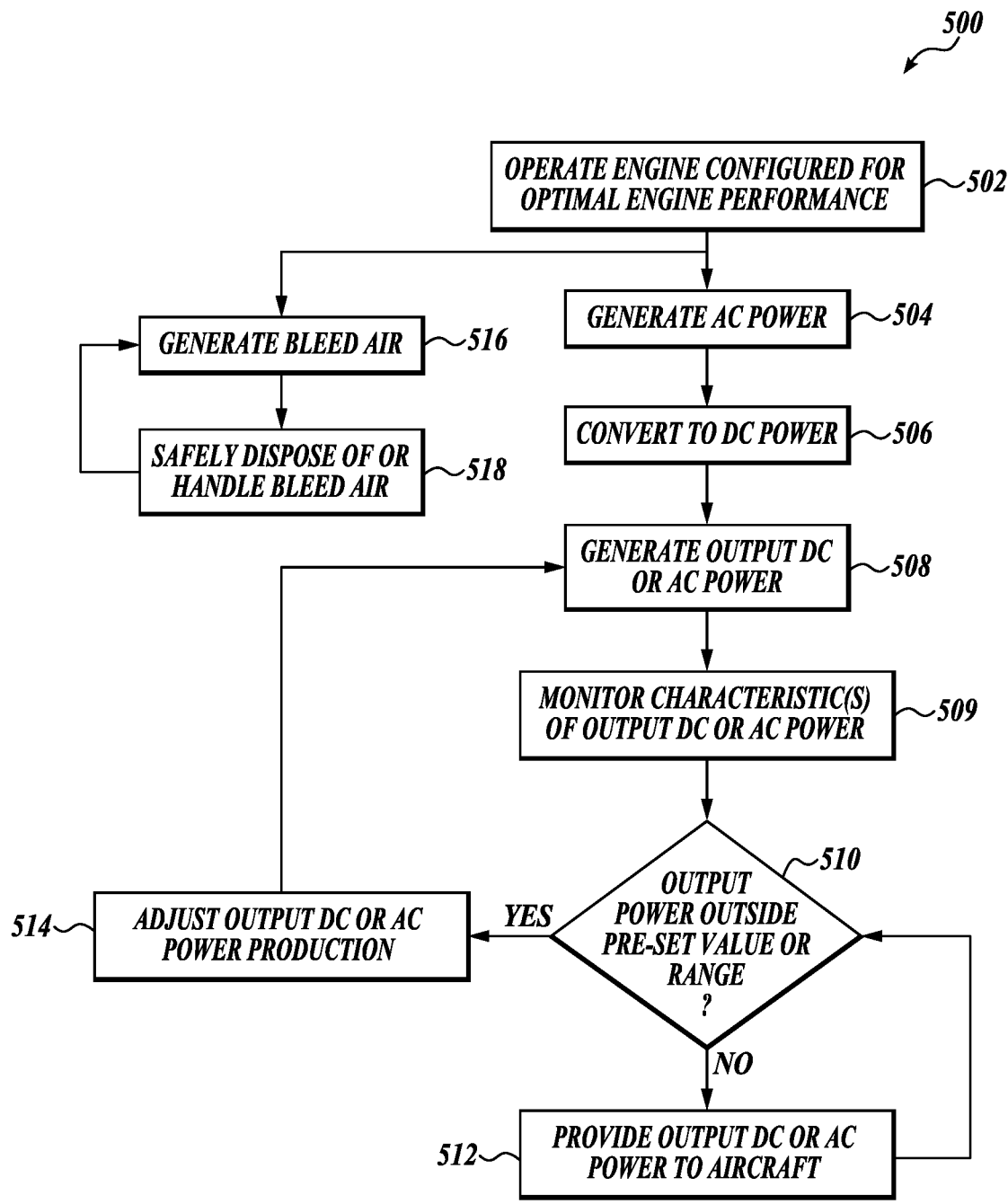
FIG. 5 depicts an example process for providing electrical/power output alone without pneumatic output to an aircraft in accordance with some embodiments of the present disclosure.
Figure 6:
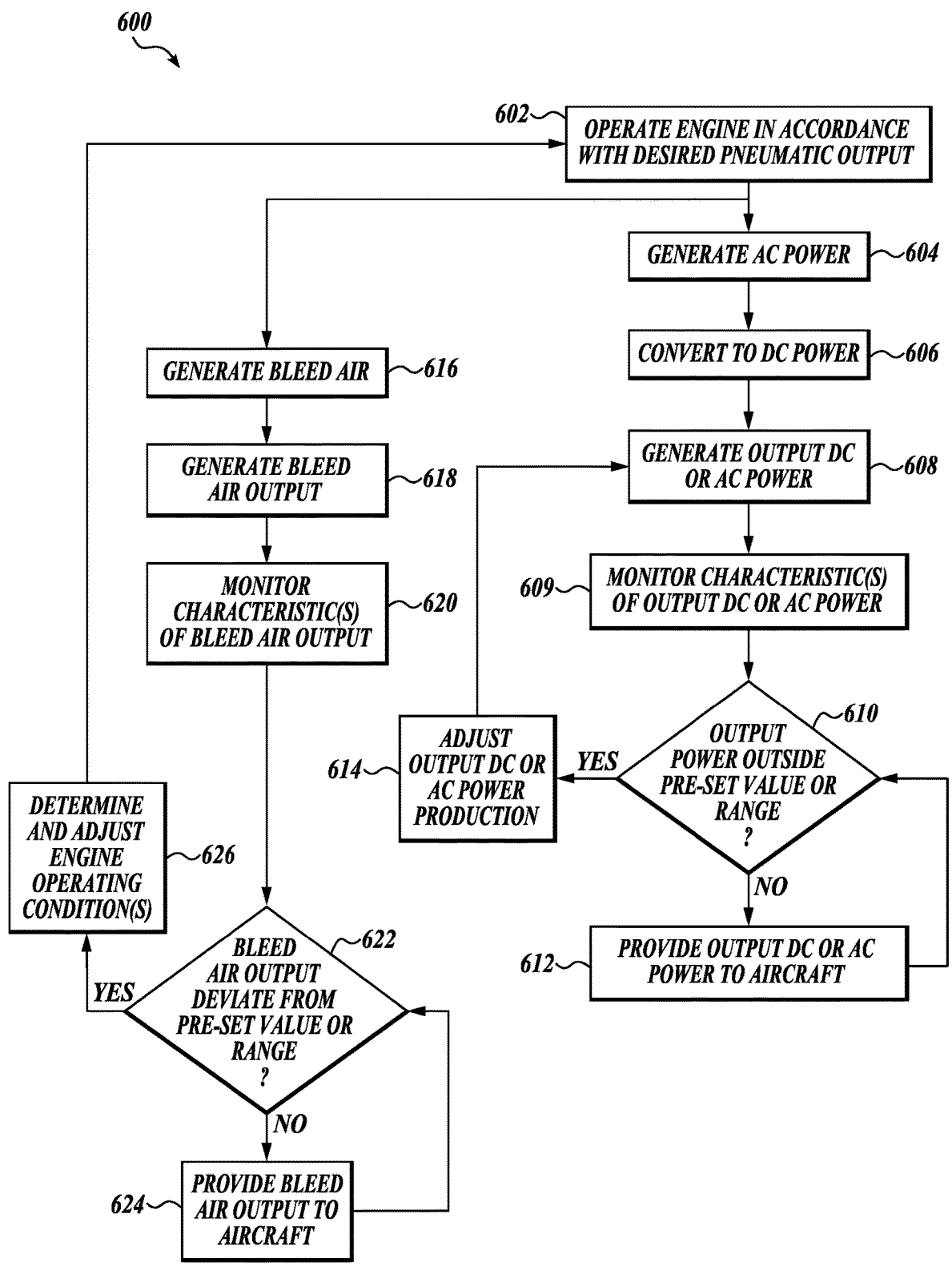
FIG. 6 depicts an example process for providing electrical/power output and bleed air output to an aircraft in accordance with some embodiments of the present disclosure.
Figure 7:
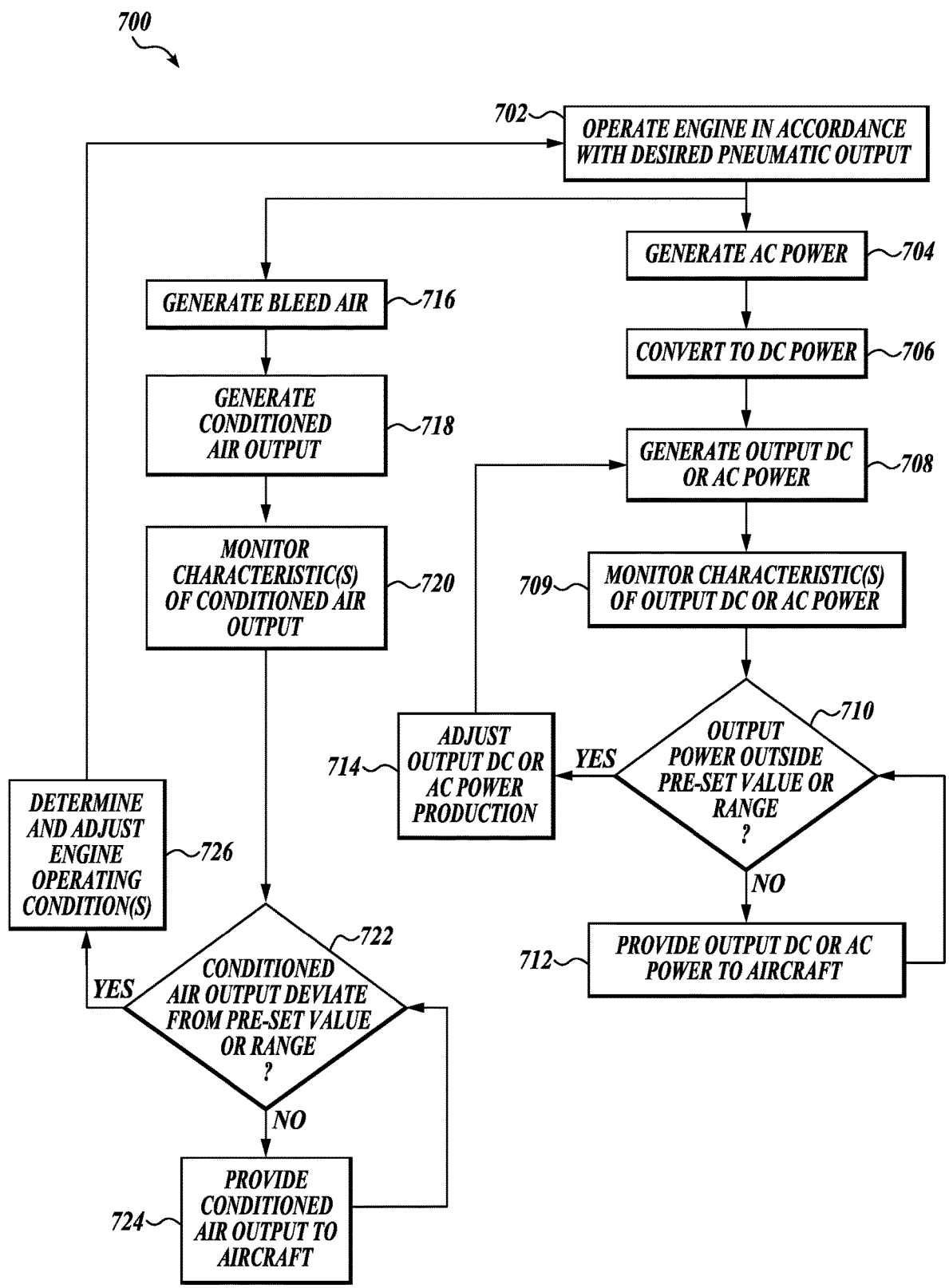
FIG. 7 depicts an example process for providing electrical/power output and conditioned air output to an aircraft in accordance with some embodiments of the present disclosure.

FIGS. 5-7 depict example processes for supplying various combinations of electrical/power output, bleed air output, and conditioned air output by system 400 in accordance with some embodiments of the present disclosure. FIG. 5 depicts an example process 500 for providing electrical/power output alone without pneumatic output to an aircraft in accordance with some embodiments of the present disclosure.

At block 502, engine 402 is configured to operate at a fixed speed and for optimal engine performance. For instance, the engine 402 is configured to operate at a speed at which high fuel efficiency is realized, engine noise is minimized, engine lifetime is prolonged, speed associated with the first output shafts of gearbox 404 is optimized for high power draw from the alternator 406, and/or the like. The rotational speed output of engine 402, and by extension the operating conditions of engine 402, need not be selected based on the characteristics of the electrical/power output to be provided to the aircraft. The selection of engine 402 operating conditions is not a function of the desired electrical/power output characteristics because the electrical/power output requirements are controlled downstream via the inverter 408 and solid state converter 410.

Next, at block 504, alternator 406 is configured to generate AC power (e.g., output 440) in accordance with the rotational speed of engine 402 and the gear ratio associated with the first output shafts of the gearbox 404. Note that an electrical generator is not implemented within system 400 or a device that converts the output of engine 402 directly into DC power. The frequency of the AC power generated at block 504, for example, does not need to be selected to match (or approximately match) the frequency of the power generated at block 508 if such power comprises AC power.

The AC power generated at block 504 is used to generate DC power (e.g., output 442) by inverter 408, at block 506.

The DC power generated at block 506 is provided to solid state converter 410 and used by the solid state converter 410 to generate the electrical/power output appropriate for the aircraft to be ground serviced (e.g., output 444), at block 508. The electrical/power output generated comprises AC or DC power, at a particular frequency (if AC power), and having a particular voltage amplitude in accordance with the particular electrical/power output requirement of the particular aircraft to be ground serviced. Different aircraft types, makes and models, configurations, etc. have respective particular electrical/power requirements for ground service. For example, a first type of aircraft may require AC power at 115 V and 400 Hz, a second type of aircraft may require DC power at 28V, a third type of aircraft may require DC power at 270 V, or the like. Different bleed air and conditioned air output requirements may also exist among the different aircraft types, makes and models, configurations, etc.

One or more characteristics of the electrical/power output generated at block 508 are monitored at block 509. In some embodiments, the characteristics that are sensed or detected about the electrical/power output can comprise, for example, the voltage level and frequency of the electrical/power output using voltage and frequency sensors 412, 414, respectively.

Next, at block 510, the electrical controls 416 (with the aid of outputs from sensors 412, 414) is configured to determine if the electrical/power output currently being provided to the aircraft exceeds a pre-set value or range. If the electrical/power output is within a pre-set threshold (e.g., within the pre-set value or range) (no branch of block 510), then the electrical/power output at the existing parameters continues to be provided to the aircraft, at block 512. If the electrical/power output is outside a pre-set threshold (e.g., deviates from the pre-set value or range) (yes branch of block 510), then process 500 proceeds to block 514. As discussed above, any number of factors such as, but not limited to, changes to electrical loads actuated on the aircraft, fluctuations in engine 402, changes in environmental conditions, external factors, and/or the like can cause the electrical/power output level to change (e.g., cause a drop in the level) from its nominal level.

At block 514, electrical controls 416 provides a command to the solid state converter 410 specifying an adjustment to the generation of the electrical/power output and in particular, to one or more parameters associated with the electrical/power output, so that the subsequent electrical/power output conforms to the pre-set value or range. Process 500 returns to block 508 to continue generation of the (next) electrical/power output.

Because the bleed air unit 420 is also directly connected to the gearbox 404 (e.g., to the second output shafts of gearbox 404), operation or actuation of engine 402 (at block 502) also causes the bleed air unit 420 to generate bleed air, at block 516, simultaneous with generation of AC power by alternator 406 at block 504. The bleed air generated at block 516 comprises unneeded pneumatic output. Accordingly, system 400 is configured to safely dispose of or use the bleed air, at block 518. As described above, bleed air generated at block 516 can be routed to the air cycle machine 422 and the resulting conditioned air recirculated back to bleed air unit 420 via line or loop 452. Alternatively, bleed air can be routed to line 450 and then through a silencer to be rejected to the ambient. Process 500 proceeds to return to block 516 to continue to safely handle the latest generated bleed air.

FIG. 6 depicts an example process 600 for providing electrical/power output and bleed air output to an aircraft in accordance with some embodiments of the present disclosure. At block 602, engine 402 is configured to operate at variable speeds in accordance with desired pneumatic output (typically a desired pressure value). In particular, engine 402 is configured to operate at variable speeds that achieves and maintains a desired pressure in the bleed air generated by bleed air unit 420, and by extension, the bleed air output. Simultaneously, the same variable speeds from the engine 402 are used to generate a fixed or constant frequency electrical/power output. Thus, in contrast to block 502 of FIG. 5 in which the speed(s) of engine 402 is selected independent of the desired frequency of the electrical/power output, in block 602, the speeds associated with the engine 402 are specifically selected based on the desired bleed air output, and in particular, the desired pressure of the bleed air output.

Next, at blocks 604-614, fixed or constant frequency electrical/power output (DC power output or AC power output at a fixed/constant frequency as required by the aircraft of interest) is generated, maintained, and provided to the aircraft to be ground serviced, from variable speeds produced by engine 402 at block 602. Blocks 604-614 are similar to respective blocks 504-514 except alternator 406, inverter 408, converter 410, sensors 412, 414, and electrical controls 416 are configured to generate fixed or constant frequency electrical/power output in the presence of variable rotational speeds from engine 402. As the engine 402, and by extension the first output shafts of gearbox 404, changes rotational speed, alternator 406 is driven at correspondingly different speeds. This causes alternator 406 to produce variable voltage and frequency AC power, at block 604.

Inverter 408 is configured to receive the variable voltage and frequency AC power from alternator 406, and in response, produce fixed/constant voltage DC power, at block 606. Next, solid state converter 410 is configured to convert the incoming DC power into either AC power at a particular frequency and voltage or DC power at a particular voltage (e.g., electrical/power output 444), as required by the aircraft to be serviced (e.g., maintenance operations), at block 608. The desired electrical/power output level to the aircraft is maintained via operations of blocks 609-614.

Simultaneous with operations of blocks 604-614, blocks 616-626 are also performed. At block 616, bleed air unit 420 is configured to generate bleed air based on variable speeds from engine 402 (from block 602) and the gear ratio of the second output shafts of gearbox 404. With the valve included in bleed air unit 420 configured to output or provide the bleed air generated by bleed air unit 420 to line 450, bleed air output is generated and provided to the aircraft, at block 618. In some embodiments, the pressure associated with the bleed air output is a function of the rotational speeds of the engine 402 while the temperature associated with the bleed air output is controlled by the heat exchanger(s) or other temperature control mechanism(s) included in the bleed air unit 420.

One or more characteristics of the bleed air output provided at block 618 are monitored at block 620. In some embodiments, the characteristics that are sensed or detected about the bleed air output can comprise, for example, the temperature and pressure of the bleed air output using temperature and pressure sensors 424, 426, respectively.

Next, at block 622, the pneumatic controls 432 (with the aid of outputs from sensors 424, 426) is configured to determine if the bleed air output currently being provided to the aircraft exceeds a pre-set value or range. If the pressure of the bleed air output is within a pre-set threshold (e.g., within the pre-set value or range) (no branch of block 622), then the bleed air output at the existing parameters continues to be provided to the aircraft, at block 624. Then process 600 returns to block 616 to continue to generate bleed air.

If the pressure of the bleed air output is outside a pre-set threshold (e.g., deviates from the pre-set value or range) (yes branch of block 622), then process 600 proceeds to block 626. As discussed above, any number of factors such as, but not limited to, changes to pneumatic loads actuated on the aircraft, changes in environmental conditions, and/or external factors can cause the pressure of the bleed air output to fluctuate from its nominal level.

At block 626, pneumatic controls 432 is configured to determine and adjust (or cause to adjust via command issued to the engine 402) the engine 402 speed (e.g., increase or decrease the speed) sufficient to re-establish the desired pressure of the bleed air output. Note that deviation in the temperature of the bleed air output does not cause the engine's 402 speed to be altered. Process 600 then returns to block 602 to alter the engine 402 speed accordingly.

FIG. 7 depicts an example process 700 for providing electrical/power output and conditioned air output to an aircraft in accordance with some embodiments of the present disclosure. Process 700 is similar to process 600 except the pneumatic output is conditioned air instead of bleed air.

Block 702 is similar to block 602 except the engine 402 is operated at variable speeds that achieves and maintains a desired pressure of the conditioned air output generated by the air cycle machine 422. At block 702, engine 402 is configured to operate at variable speeds in accordance with desired pneumatic output (typically a desired pressure value). Simultaneously, the same variable speeds from the engine 402 are used to generate a fixed or constant frequency electrical/power output. Thus, in contrast to block 502 of FIG. 5 in which the speed(s) of engine 402 is selected independent of the desired frequency of the electrical/power output, in block 702, the speeds associated with the engine 402 are specifically selected based on the desired conditioned air output, and in particular, the desired pressure of the conditioned air output.

Next, at blocks 704-714, fixed or constant frequency electrical/power output (DC power output or AC power output at a fixed/constant frequency as required by the aircraft of interest) is generated, maintained, and provided to the aircraft to be ground serviced, from variable speeds produced by engine 402 at block 702. Blocks 704-714 are similar to respective blocks 604-614.

Simultaneous with operations of blocks 704-714, blocks 716-726 are also performed. At block 716, bleed air unit 420 is configured to generate bleed air based on variable speeds from engine 402 (from block 702) and the gear ratio of the second output shafts of gearbox 404. With the valve included in bleed air unit 420 configured to output or provide the bleed air generated by bleed air unit 420 to line 446, the bleed air is inputted to the air cycle machine 422 and the air cycle machine 422 produces conditioned air output to line 448, at block 718. In some embodiments, the pressure associated with the conditioned air output is a function of the rotational speeds of the engine 402 while the temperature associated with the conditioned air output is controlled by the heat exchanger(s) or other temperature control mechanism(s) included in the air cycle machine 422.

One or more characteristics of the conditioned air output provided at block 718 are monitored at block 720. In some embodiments, the characteristics that are sensed or detected about the conditioned air output can comprise, for example, the temperature and pressure of the conditioned air output using temperature and pressure sensors 428, 430, respectively.

Next, at block 722, the pneumatic controls 432 (with the aid of outputs from sensors 428, 430) is configured to determine if the conditioned air output currently being provided to the aircraft exceeds a pre-set value or range. If the pressure of the conditioned air output is within a pre-set threshold (e.g., within the pre-set value or range) (no branch of block 722), then the conditioned air output at the existing parameters continues to be provided to the aircraft, at block 724. Then process 700 returns to block 716 to continue to generate bleed air.

If the pressure of the conditioned air output is outside a pre-set threshold (e.g., deviates from the pre-set value or range) (yes branch of block 722), then process 700 proceeds to block 726. As discussed above, any number of factors such as, but not limited to, changes to pneumatic loads actuated on the aircraft, changes in environmental conditions, and/or external factors can cause the pressure of the conditioned air output to fluctuate from its nominal level.

At block 726, pneumatic controls 432 is configured to determine and adjust (or cause to adjust via command issued to the engine 402) the engine 402 speed (e.g., increase or decrease the speed) sufficient to re-establish the desired pressure of the conditioned air output. Note that deviation in the temperature of the conditioned air output does not cause the engine's 402 speed to be altered. Process 700 then returns to block 702 to alter the engine 402 speed accordingly.

In this manner, a variety of control schemes are used to command engine 402 to operate to produce variable rotational speeds output to maintain desired pneumatic output (e.g., desired pressure of bleed air output or desired pressure of conditioned air output) while simultaneously generating fixed frequency electrical/power output from the same variable speeds from engine 402. Both the pneumatic output and electrical output can be controlled to have respective desired characteristics simultaneously driven by the same single engine or prime mover.

When only electrical/power output is to be provided to an aircraft, the engine 402 speed is fixed at a speed optimal for engine performance. Such engine speed is not optimized to match the desired AC frequency of an AC electrical/power output, and instead relies on electrical components downstream of the alternator 406 (e.g., inverter 408, converter 410, etc.) to produce the desired AC frequency. When system 400 is operated to provide a pneumatic output to an aircraft, engine 402 speed(s) is selected as a function of the desired pressure of the pneumatic output. As the desired pressure of the pneumatic output decreases, the engine 402 speed is increased. Conversely, as the desired pressure increases, the engine 402 speed is decreased. Pressure of the pneumatic output is measured with a pressure transducer on the bleed air output line (when bleed air output is being provided to the aircraft) or on the conditioned air output line (when conditioned air output is being provided to the aircraft), to be monitored by a digital controller (e.g., pneumatic controls 432) connected to or in communication with the engine 402.

While illustrative embodiments have been illustrated and described, it will be appreciated that various changes can be made therein without departing from the spirit and scope of the invention. In this regard, although example parameters have been set forth in above for the bleed air, conditioned air, and electrical supply produced by the ground support system 10 or 400, the system 10 or 400 can supply bleed air, conditioned air, and electrical supply at other parameters.

What is claimed is:
1. An integrated ground support system for an aircraft, the system comprising:
  a frame on which the system is arranged as a singular assembly;
  an engine mounted on the frame and configured to power the system;

a drive train, an alternator, and a bleed air unit mounted on the frame, the drive train disposed between and interconnected to the engine and each of the alternator and the bleed air unit;

one or more electrical components mounted on the frame and electrically connected to the alternator, wherein the one or more electrical components is configured to produce electrical power for use by the aircraft; and an air cycle machine mounted on the frame and connected to the bleed air unit, wherein the bleed air unit is configured to produce bleed air for use by the aircraft and the air cycle machine is configured to produce conditioned air for use by the aircraft, wherein the engine operates at a first operational state associated with a first rotational speed that is independent of a frequency associated with the electrical power, if only the electrical power is to be used by the aircraft, and the engine operates at a second operational state associated with a second rotational speed, different from the first rotational speed, that is a function of a pressure associated with the bleed air or the conditioned air, if the electrical power and one of the bleed air or the conditioned air are to be used simultaneously by the aircraft.

2. The system of claim 1, wherein the one or more electrical components comprises an rectifier and a power converter mounted on the frame, the rectifier disposed between and electrically connected to the alternator and the power converter, and wherein the power converter is configured to output the electrical power.

3. The system of claim 2, wherein the alternator produces an alternating current (AC) output, the rectifier is configured to rectify the AC output to produce a direct current (DC) output, and the power converter is configured to convert the DC output to produce the electrical power.

4. The system of claim 3, wherein a frequency of the AC output is in accordance with a rotational speed of the engine and a gear ratio of a gear mechanism associated with an output shaft included in the drive train and connected to the alternator.

5. The system of claim 2, further comprising:
a first control loop connected to the power converter and configured to monitor and maintain the electrical power at a level required by the aircraft; and
a second control loop connected to the bleed air unit and the air cycle machine and configured to monitor and maintain the bleed air or conditioned air at a level required by the aircraft.

6. The system of claim 5, wherein the first control loop includes a voltage sensor, a frequency sensor, and a controller, wherein the voltage and frequency sensors are configured to monitor voltage and frequency of the electrical power, and wherein the controller is configured to process the monitored voltage and frequency and determine adjustment to production of the electrical power by the power converter.

7. The system of claim 5, wherein the second control loop includes a first pressure sensor, a second pressure sensor, and a controller, wherein the first pressure sensor is configured to monitor pressure of the bleed air and the second pressure sensor is configured to monitor pressure of the conditioned air, and wherein the controller is configured to process the monitored pressure and determine adjustment to a rotational speed of the engine.

8. The system of claim 5, wherein the second control loop includes a first temperature sensor, a second temperature sensor, and a controller, wherein the first temperature sensor is configured to monitor temperature of the bleed air and the second temperature sensor is configured to monitor temperature of the conditioned air, and wherein the controller is configured to process the monitored temperature and determine adjustment to a heat exchange mechanism included in the bleed air unit or air cycle machine.

9. The system of claim 1, wherein, if only the electrical power is to be used by the aircraft, the bleed air is exhausted to the ambient or output of the bleed air unit comprises an input to the air cycle machine to produce the conditioned air, and the conditioned air is provided to the bleed air unit.

10. The system of claim 1, wherein the first rotational speed comprises fixed rotational speed and the second rotational speed comprises variable rotational speed.

11. The system of claim 1, wherein the first rotational speed comprises a speed of the engine at which high fuel efficiency is realized, engine noise is minimized, engine lifetime is prolonged, or a speed associated with an output shaft of the drive train connected to the alternator is optimized for high power draw from the alternator.

12. The system of claim 1, wherein the electrical power comprises alternating current (AC) power, AC power at a constant frequency and voltage, direct current (DC) power, DC power at a constant voltage, 400 Hertz (Hz) and 115 Volt (V) DC, 28 V DC, or 270 V DC.

13. The system of claim 1, wherein the bleed air comprises high pressure and high temperature air or 35-50 pound-force per square inch gauge (psig) at 250-320° F., and wherein the conditioned air comprises lower pressure and low temperature air or 3-5 psig at 40-35° F.

14. An integrated ground support system for an aircraft, the system comprising:
a frame on which the system is arranged as a singular assembly;
an engine mounted on the frame and configured to power the system;
a drive train, an alternator, and a bleed air unit mounted on the frame, the drive train disposed between and interconnected to the engine and each of the alternator and the bleed air unit;
an rectifier and a power converter mounted on the frame, the rectifier disposed between and electrically connected to the alternator and the power converter, wherein the power converter is configured to produce electrical power for use by the aircraft;
a first control loop connected to the power converter and configured to monitor and maintain the electrical power at a level required by the aircraft;
an air cycle machine mounted on the frame and connected to the bleed air unit, wherein the bleed air unit is configured to produce bleed air for use by the aircraft and the air cycle machine is configured to produce conditioned air for use by the aircraft; and
a second control loop connected to the bleed air unit and the air cycle machine and configured to monitor and maintain the bleed air or conditioned air at a level required by the aircraft,
wherein the engine operates at a first operational state associated with a first rotational speed that is independent of a frequency associated with the electrical power, if only the electrical power is to be used by the aircraft, and the engine operates at a second operational state associated with a second rotational speed, different from the first rotational speed, that is a function of a pressure associated with the bleed air or the conditioned air, if the electrical power and one of the bleed air or the conditioned air are to be used simultaneously by the aircraft.

15. The system of claim 14, wherein the alternator produces an alternating current (AC) output, the rectifier is configured to rectify the AC output to produce a direct current (DC) output, and the power converter is configured to convert the DC output to produce the electrical power.

16. The system of claim 14, wherein the first control loop includes a voltage sensor, a frequency sensor, and a controller, wherein the voltage and frequency sensors are configured to monitor voltage and frequency of the electrical power, and wherein the controller is configured to process the monitored voltage and frequency and determine adjustment to production of the electrical power by the power converter.

17. The system of claim 14, wherein the second control loop includes a first pressure sensor, a second pressure sensor, and a controller, wherein the first pressure sensor is configured to monitor pressure of the bleed air and the second pressure sensor is configured to monitor pressure of the conditioned air, and wherein the controller is configured to process the monitored pressure and determine adjustment to a rotational speed of the engine.

18. The system of claim 14, wherein, if only the electrical power is to be used by the aircraft, the bleed air is exhausted to the ambient or output of the bleed air unit comprises an input to the air cycle machine to produce the conditioned air, and the conditioned air is provided to the bleed air unit.

19. The system of claim 14, wherein the first rotational speed comprises fixed rotational speed and the second rotational speed comprises variable rotational speed.

20. The system of claim 14, wherein the electrical power comprises alternating current (AC) power, AC power at a constant frequency and voltage, direct current (DC) power, DC power at a constant voltage, 400 Hertz (Hz) and 115 Volt (V) DC, 28 V DC, or 270 V DC, wherein the bleed air comprises high pressure and high temperature air or 35-50 pound-force per square inch gauge (psig) at 250-320° F., and wherein the conditioned air comprises lower pressure and low temperature air or 3-5 psig at 40-35° F.

* * * * *

UNITED STATES PATENT AND TRADEMARK OFFICE
CERTIFICATE OF CORRECTION

PATENT NO. : 10,589,874 B2
APPLICATION NO. : 16/177313
DATED : March 17, 2020
INVENTOR(S) : Nestel et al.

Page 1 of 1

It is certified that error appears in the above-identified patent and that said Letters Patent is hereby corrected as shown below:

In the Claims

| Column | Line | |
|--------|------|---|
| 17 | 26 | Please change "an rectifier" to --a rectifier-- |
| 18 | 43 | Please change "an rectifier" to --a rectifier-- |

Signed and Sealed this
Eleventh Day of August, 2020

Andrei Iancu
*Director of the United States Patent and Trademark Office*